United States Patent
Noma et al.

(10) Patent No.: US 10,638,381 B2
(45) Date of Patent: Apr. 28, 2020

(54) COMMUNICATION SYSTEM

(71) Applicants: Satoshi Noma, Tokyo (JP); Vivek Sharma, Tokyo (JP)

(72) Inventors: Satoshi Noma, Tokyo (JP); Vivek Sharma, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 14/381,932

(22) PCT Filed: Mar. 8, 2013

(86) PCT No.: PCT/JP2013/057322
§ 371 (c)(1),
(2) Date: Aug. 28, 2014

(87) PCT Pub. No.: WO2013/137420
PCT Pub. Date: Sep. 19, 2013

(65) Prior Publication Data
US 2015/0063296 A1 Mar. 5, 2015

(30) Foreign Application Priority Data
Mar. 16, 2012 (GB) .................................. 1204700.7

(51) Int. Cl.
*H04W 36/00* (2009.01)
(52) U.S. Cl.
CPC ... *H04W 36/0066* (2013.01); *H04W 36/0022* (2013.01)
(58) Field of Classification Search
CPC . H04W 36/0022; H04W 48/18; H04W 36/14; H04W 88/06; H04W 36/24
See application file for complete search history.

(56) References Cited

U.S. PATENT DOCUMENTS

| 8,547,912 | B1* | 10/2013 | Breau | ............. H04W 8/26 370/329 |
| 8,649,291 | B2 | 2/2014 | Wang et al. | |
| 2008/0102896 | A1 | 5/2008 | Wang et al. | |
| 2009/0047957 | A1 | 2/2009 | Westerberg | |

(Continued)

FOREIGN PATENT DOCUMENTS

| CN | 101779487 A | 7/2010 |
| CN | 102026328 A | 4/2011 |

(Continued)

OTHER PUBLICATIONS

Japanese Office Action dated Aug. 5, 2015 with a partial English translation thereof.

(Continued)

*Primary Examiner* — Jung H Park
(74) *Attorney, Agent, or Firm* — Wilmer Cutler Pickering Hale and Dorr LLP

(57) ABSTRACT

A communication system is described in which an LTE base station and network are shared by two or more CDMA operators. Mobility parameters for the different CDMA operators are available and selection between the parameters is performed by the LTE base station, a mobile telephone connected to the LTE base station or a network node, such as an O&M node. The selection is performed based on information relating to subscription information for the mobile telephone.

11 Claims, 7 Drawing Sheets

(56) References Cited

U.S. PATENT DOCUMENTS

| | | | |
|---|---|---|---|
| 2009/0088154 A1 | 4/2009 | Umatt et al. | |
| 2010/0290437 A1 | 11/2010 | Wang et al. | |
| 2011/0051683 A1* | 3/2011 | Ramankutty | H04W 36/0033 370/331 |
| 2011/0274046 A1* | 11/2011 | Rune | H04J 11/0069 370/328 |
| 2012/0120789 A1* | 5/2012 | Ramachandran | H04W 36/0022 370/220 |
| 2012/0307621 A1* | 12/2012 | Zawaideh | H04W 76/19 370/216 |
| 2013/0044709 A1* | 2/2013 | Adjakple | H04W 76/025 370/329 |
| 2013/0072156 A1* | 3/2013 | Cakulev | H04W 12/06 455/411 |
| 2014/0051445 A1* | 2/2014 | Vikberg | H04W 36/02 455/436 |
| 2014/0092871 A1 | 4/2014 | Wang et al. | |
| 2014/0177599 A1* | 6/2014 | Tao | H04W 36/0022 370/331 |

FOREIGN PATENT DOCUMENTS

| | | |
|---|---|---|
| CN | 102316528 A | 1/2012 |
| EP | 1 835 780 A2 | 9/2007 |
| EP | 2 205 022 A1 | 7/2010 |
| EP | 2009/0088154 A1 | 12/2010 |
| EP | 2 276 313 A1 | 1/2011 |
| EP | 2536205 A1 | 12/2012 |
| EP | 2189025 B1 | 8/2016 |
| JP | 2007-515826 A | 6/2007 |
| JP | 2007-221786 A | 8/2007 |
| JP | 2008-283322 A | 11/2008 |
| JP | 2010-536261 A | 11/2010 |
| JP | 2010-541496 A | 12/2010 |
| JP | 2011-130173 A | 6/2011 |
| JP | 2013-527691 A | 6/2013 |
| KR | 10-2009-0085640 A | 8/2009 |
| WO | WO-2005/027556 A1 | 3/2005 |
| WO | WO 2005/060296 A1 | 6/2005 |
| WO | WO 2011/020002 A1 | 2/2011 |
| WO | WO-2012/009991 A1 | 1/2012 |

OTHER PUBLICATIONS

NEC Corporation, "CDMA2000 Interworking in Shared RAN", R2-121577, 3GPP TSG RAN2 Meeting WGC #77bis, Internet: <URL:http://www.gpp.org/ftp/tsg_ran/WG2_RL2/TSGR2_77bis/Docs/R2-121577.zip>, Mar. 26-30, 2012, Jeju, South Korea.

Alcatel-Lucent. "CDMA Interworking in Shared LTE Networks", R2-120620, 3GPP TSG-RAN WG2 Meeting #77, <URL:http://www.3gpp.org/ftp/tsg_ran/WG2_RL2/TSGR2_77/Docs/R2-120620.zip> Feb. 6-10, 2012, Dresden, Germany.

International Search Report in PCT/JP2013/057322 dated Sep. 17, 2013 (English Translation Thereof).

3GPP2 A.S0009-C v4.0 Apr. 2011 "Interoperability Specification (IOS) for High Rate Packet Data (HRPD) Radio Access Network Interfaces with Session Control in the Packet Control Function".

3GPP TS 36.331 V10.5.0 (Mar. 2012) 3rd Generation Partnership Project; Technical Specification Group Radio Access Network; Evolved Universal Terrestrial Radio Access (E-UTRA);Radio Resource Control (RRC); Protocol specification (Release 10).

3 GPP TS 23.251 v10.3.0 (Mar. 2012) 3rd Generation Partnership Project; Technical Specification Group Services and System Aspects; Network Sharing; Architecture and functional description (Release 10).

3 GPP2 C.S0097-0 Version 2.0 Apr. 2011 "E-UTRAN-cdma2000 1x Connectivity and Interworking Air Interface Specification".

Alcatel-Lucent "Network Sharing in LTE Opportunity & Solutions", Technology White Paper, Jul. 6, 2011, http://4g-portal.com/lte-network-sharing, 19 pages.

Korean Office Action corresponding to Korean Application No. 10-2014-7028598, dated Dec. 28, 2015, 8 pages.

Japanese Office Action issued in corresponding Japanese Application No. 2014-544279, dated Apr. 6, 2016, 8 pages.

Chinese First Office Action issued in Chinese Patent Application No. 201380014615.3, dated Jun. 26, 2017, 16 pages.

Japanese Office Action issued by the Japan Patent Office for Japanese Application No. 2016-133969 dated Jun. 21, 2017 (8 pages).

NEC, "CDMA interworking in shared RAN (RAN WG2 LS: R2-123141/S2-122663)," SA WG2 Meeting #92, S2-122758, Agenda Item 4/7.3.1, Barcelona, Spain, Jul. 9-13, 2012 (4 pages).

* cited by examiner

COMMUNICATION SYSTEM

TECHNICAL FIELD

The present invention relates to a radio access network in a cellular or wireless telecommunications network, and particularly but not exclusively to communication systems in which the use of base stations and in some cases parts of the core network are shared between two or more operators. The invention has particular but not exclusive relevance to wireless telecommunications networks implemented according to the LTE standard.

BACKGROUND ART

Radio Access Network (RAN) sharing deployment scenarios are known and methods and abilities to facilitate implementations of these scenarios have been introduced into the 3G standards since Release 5.

RAN sharing provides a way for network operators (service providers) to reduce their capital expenditure requirements and/or widen the area covered by a cellular communication service when setting up a wireless communications network. Rather than each operator having to provide their own base station and associated equipment for each cell of the network, an operator sharing the RAN of another operator is able to provide their service into areas served by the other operator without having to invest in their own base stations in that location.

Furthermore, by reducing the number of base stations that must be provided and operated, the ongoing operating costs can be reduced for the sharing operators. Indeed, each base station may draw a large amount of electricity during operation, and therefore reducing the number of operating base stations may significantly reduce electrical power requirements and may therefore also be considered environmentally friendly.

In some shared schemes, only the RAN base stations themselves are shared by the different operators. In other shared schemes, parts of the core network, for example the Evolved Packet Core (EPC) in LTE, can be shared as well as the RAN base stations, further decreasing capital expenditure costs in setting up the network.

The mechanisms for sharing of RANs may also be useful in the case of mergers of operator companies, allowing the two operators to merge their network services without any significant interruptions in service provision.

LTE base stations and their associated core networks provide a packet switched service and do not support circuit switched services such as voice calls. Therefore, when a user of a mobile phone (or another piece of so-called "user equipment" (UE) such as a portable digital assistant) wishes to make a voice call on an LTE network, it is necessary for the phone to "fall back" onto an alternative network which exists in parallel with the LTE network and which does support voice calls. Examples of such alternative networks are Code Division Multiple Access (CDMA) networks, such as CDMA2000 (C2K) networks or UMTS networks. A similar fall back procedure is also performed in other situations, such as for SRVCC (single radio voice call continuity) whereby a VoIP call is handed over from the LTE network to the UMTS/CDMA2000 network.

SUMMARY OF INVENTION

Technical Problem

As part of the fallback and handover process, the LTE base station (or so-called "eNB") typically provides the user equipment with appropriate mobility parameters to enable it to handover to the alternative network. However, when two or more network operators share the LTE base station, the base station does not know to which operator the UE is subscribed and so it cannot provide the proper content (parameters) of some Information Elements (IEs) to the UE as they may be different for each C2K operator when the UE is moving from the LTE network to the C2K network.

One example of such a parameter is a MobilityParametersCDMA IE in a CSFBParametersResponseCDMA2000 message (details of which can be found in sections 5.6.4 and 5.4.4.3 of TS 36.331 V10.5.0, the contents of which are hereby incorporated by reference). Here, CSFB refers to "Circuit Switched Fall Back". Currently, this IE is supplied by the LTE eNB locally, and it includes cell-specific parameters for a UE moving to a C2K network. However, as mentioned above, if the LTE eNB is shared by two C2K operators then it is unclear to the eNB how to set this IE.

Another example of a parameter for mobility purposes is RAND-CDMA2000, which defines the security parameters to be used for the UE communications with the C2K base station. A further example is the Neighbour cell List that is provided by the LTE base station in the Measconfig IE, that identifies the neighbouring cells that the UE should monitor.

Solution to Problem

Embodiments of the invention aim to at least partially address some of the problems with the prior art described above.

According to a first aspect of the present invention there is provided an network communications apparatus (for example an LTE node or combination of nodes) for use in communicating with a mobile communications device, the network communications apparatus comprising: means for receiving first and second sets of parameters for mobility purposes when performing an handover procedure, each set of parameters being associated with a respective network operator; means for selecting one of the first and second sets of parameters using information relating to subscription information associated with the mobile communications device; and means for transmitting the selected set of parameters towards the mobile communications device for use when handing over to the network to which the selected set of parameters corresponds. The parameters for mobility purposes may include one or more of the above described parameters (e.g. mobility parameters, security parameters, and the Neighbour Cell Lists etc).

In a first embodiment the network communications apparatus comprises a shared LTE base station configured to serve a plurality of network operators.

In the first embodiment, the LTE network communications apparatus may be configured to broadcast a plurality of LTE network identities, and the network communications apparatus further comprises means for determining the LTE network identity selected by the mobile communications device, and means for mapping the selected LTE network identity to a corresponding CDMA network identity, wherein the information relating to subscription information includes the selected LTE network identity. The means for mapping may be configured to use a mapping table provided by an operations and management node.

Alternatively, the LTE network communications apparatus may further comprise means for requesting and receiving the subscription information from a separate node of the LTE network.

In a second embodiment the network communications apparatus comprises a node within an LTE core network.

In the second embodiment the LTE network communications apparatus may comprise means for determining an LTE network identity selected by the mobile communications device, and means for mapping the selected LTE network identity to a corresponding CDMA network identity, wherein the information relating to subscription information includes the selected LTE network identity. The means for mapping may be configured to use a mapping table provided by an operations and management node.

With both the embodiments mentioned above, the mapping table may comprise a data array having fields specifying, in correspondence: (i) a CDMA cell or base station identity, (ii) a CDMA operator PLMN identity, and (iii) an LTE operator PLMN identity.

According to a second aspect of the present invention there is provided a mobile communications device for use with an LTE communications network and a CDMA network, the mobile communications device comprising: means for receiving, from the LTE communications network, first and second sets of parameters for mobility purposes when performing an LTE to CDMA handover procedure, each set of parameters being associated with a respective CDMA network and network operator; means for selecting one of the first and second sets of parameters using information relating to subscription information associated with the mobile communications device; and means for using the selected set of parameters when handing over from the LTE network to the CDMA network to which the selected set of parameters corresponds.

According to a third aspect of the present invention there is provided a method performed by an LTE network communications apparatus communicating with a mobile communications device, the method comprising: receiving first and second sets of parameters for mobility purposes when performing an LTE to CDMA handover procedure, each set of parameters being associated with a respective CDMA network and network operator; selecting one of the first and second sets of parameters using information relating to subscription information associated with the mobile communications device; and transmitting the selected set of parameters towards the mobile communications device for use when handing over from the LTE network to the CDMA network to which the selected set of parameters corresponds.

In a first embodiment the method is performed by a shared LTE base station serving a plurality of network operators.

In the first embodiment, the base cation may be broadcasting a plurality of LTE network identities, and the method further comprises determining a LTE network identity selected by the mobile communications device, and mapping the selected LTE network identity to a corresponding CDMA network identity, wherein the information relating to subscription information includes the selected LIE network identity. The mapping may use a mapping table provided by an operations and management node.

Alternatively, the method may further comprise requesting and receiving the subscription information from another node of the LTE network.

In a second embodiment the method may be performed by a node within the LTE core network.

In the second embodiment the method may comprise determining an LTE network identity selected by the mobile communications device, and mapping the selected LTE network identity to a corresponding CDMA network identity, wherein the information relating to subscription information includes the selected LTE network identity. The mapping may use a mapping table provided by an operations and management node.

With both the embodiments mentioned above, the mapping table may comprise a data array having fields specifying, in correspondence: (i) a CDMA cell or base station identity, (ii) a CDMA operator PLMN identity, and (iii) an LTE operator PLMN identity.

According to a fourth aspect of the present invention there is provided a method for handing over a mobile communications device from an LTE communications network to a CDMA network, the method being performed by the mobile communications device and comprising: receiving, from the LTE communications network, first and second sets of parameters for mobility purposes when performing an LTE to CDMA handover procedure, each set of parameters being associated with a respective CDMA network and network operator; selecting one of the first and second sets of parameters using information relating to subscription information associated with the mobile communications device; and using the selected set of parameters to perform a handover procedure from the LTE network to the CDMA network to which the selected set of parameters corresponds.

According to a fifth aspect of the present invention there is provided a mapping table for use in determining mobility parameters for a mobile communications device when handing over from an LTE network to a CDMA network, the mapping table comprising a data array having fields specifying, in correspondence: (i) a CDMA cell or base station identity, (ii) a CDMA operator PLMN identity, and (iii) an LTE operator PLMN identity.

According to a sixth aspect of the present invention there is provided an operations and management node associated with an LTE network, the operations and management node comprising: a data array having fields specifying, in correspondence: (i) a CDMA cell or base station identity, (ii) a CDMA operator PLMN identity, and (iii) an LTE operator PLMN identity. The operations and management node further comprises means for receiving said identities; means for populating the data array with said identities; and means for using the data array as part of a handover procedure used to handover a mobile communications device from an LTE network to a CDMA network.

Finally, according to a seventh aspect of the invention there is provided a computer implementable instructions product comprising computer implementable instructions for causing a programmable computer device to become configured as an LTE network communications apparatus or node as mentioned above, or to become configured as a mobile communications device as mentioned above, or to implement a method as mentioned above, or to provide a mapping table as mentioned above.

BRIEF DESCRIPTION OF DRAWINGS

Exemplary embodiments of the invention will now be described, by way of example, with reference to the accompanying drawings in which.

In the figures, like elements are indicated by like reference numerals throughout.

DESCRIPTION OF EMBODIMENTS

Overview

Figure 1:
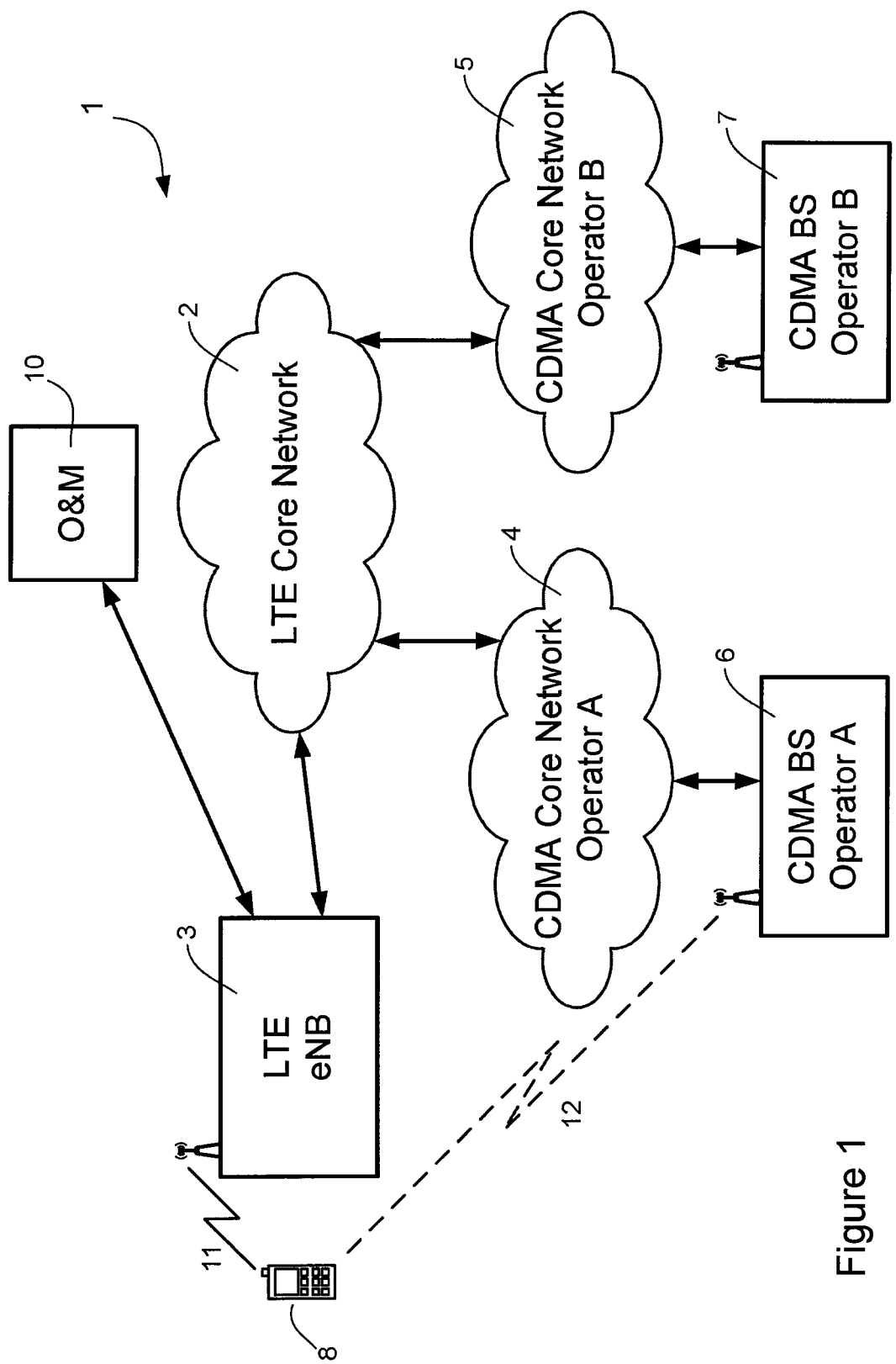
FIG. 1 schematically illustrates a mobile telecommunication system of a type to which the invention is applicable.

FIG. 1 schematically illustrates a mobile (cellular) telecommunication system 1 in which two network operators, operators A and B, are able to provide mobile wireless data communications services. In the example system illustrated, operators A and B share a core LTE network 2, to which one or more shared LTE base stations (or eNBs) are connected, such as base station 3. The core LTE network 2 and the base station 3 allow one or more mobile telephones, or user equipments, 8 to connect to the network and receive data communications services. As will be understood by those skilled in the art, each base station 3 operates one or more base station cells in which data communications can be made between the base station 4 and the mobile telephone 8.

With respect to the shared LTE core network 2 and shared LTE base station (eNB) 3, operators A and B agree to share in the capacity of the LTE core network 2 and base station 3 such that both a mobile telephone associated with operator A and a mobile telephone associated with operator B are able to connect to the network 2 via the shared base station 3 as though connecting through equipment provided by their own respective network operator. Such an arrangement may be useful in areas of low population density, or more generally areas having low bandwidth requirements, in order to allow both network operators to provide their service to that area without requiring both network operators to install their own base station in that area.

Each operator's network is typically associated with a unique PLMN (Public Land Mobile Network) id value, which is used in the wireless communication network to identify connections associated with a particular network operator. Typically, the network operators will contract to be provided with a certain proportion of the resources available at the shared base station. For security reasons, connections relating to a particular network operator may be isolated from connections relating to other network operators based on the PLMN id value associated with each connection.

As an LTE network only allows packet switched data communications and does not support circuit switched voice calls, when a user of a mobile phone 8 (or another user equipment) wishes to make a voice call on an LTE network, the phone "falls back" onto an alternative network which exists alongside the LTE network and which supports voice calls, such as a CDMA network. In the example system illustrated in FIG. 1, two CDMA core networks 4, 5 exist alongside the core LTE network 2, with CDMA core network 4 being provided by operator A, and CDMA core network 5 being provided by operator B. FIG. 1 also shows a CDMA base station 6 provided by operator A and a CDMA base station 7 provided by operator B.

To illustrate this fall back procedure, and with reference initially to FIG. 1, we shall take mobile phone 8 as being associated with operator A. As illustrated, for the purposes of data communications via the LTE network 2, the mobile phone 8 communicates with the LTE base station 3 via radio link 11. However, if the user wishes to conduct a voice call, the mobile phone 8 falls back such that it communicates with operator A's CDMA core network 4 via operator A's base station 6—in effect switching its radio link from link 11 to link 12. (Conversely, it will be appreciated that, if the mobile phone were associated with operator B rather than operator A, then the fallback process would be to establish a link with operator B's CDMA base station 7, and thence to operator B's CDMA core network 6.)

To enable the fallback process to happen from link 11 to link 12, the LTE base station 3 provides the mobile phone 8 with appropriate parameters for mobility purposes, to enable it to switch from link 11 to link 12 and thereby enable the user to conduct voice communication via CDMA base station 6 and CDMA core network 4. In the subsequent figures, such mobility parameters for operator A are denoted by MP_A, and those for operator B are denoted by MP_B. In practice, MP_A and MP_B may each be a single parameter or a set of parameters. In the present example, since the phone 8 is taken as being associated with operator A, the mobility parameters that need to be transmitted to the phone 8 are those denoted by MP_A.

Figure 2:
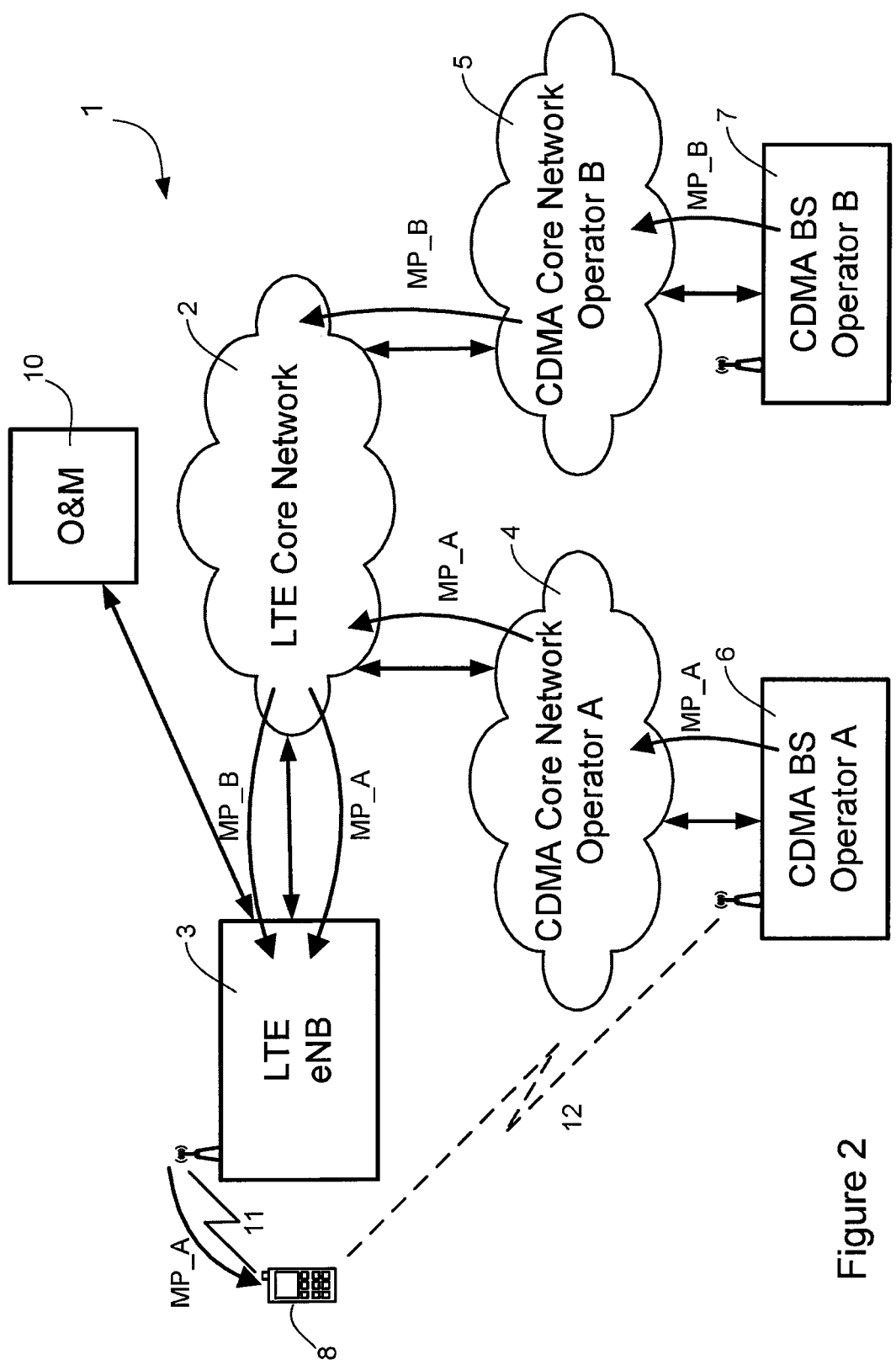
FIG. 2 schematically illustrates a mobile telecommunication system as in FIG. 1, in which the LTE base station is configured to select the mobility parameters to be transmitted to a mobile phone.
Figure 4:
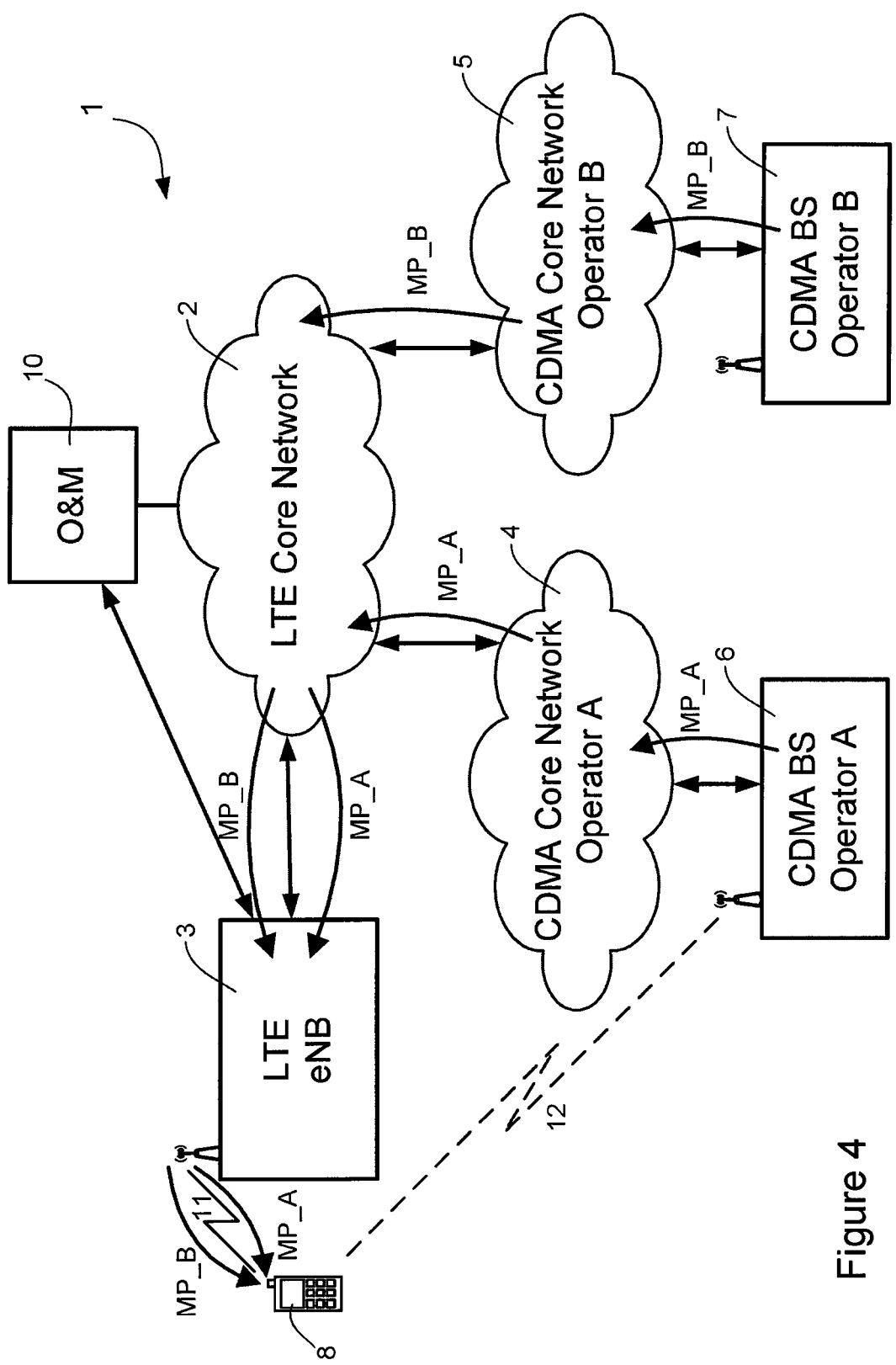
FIG. 4 schematically illustrates a mobile telecommunication system as in FIG. 1, in which the user equipment performs a selection of mobility parameters.
Figure 6:
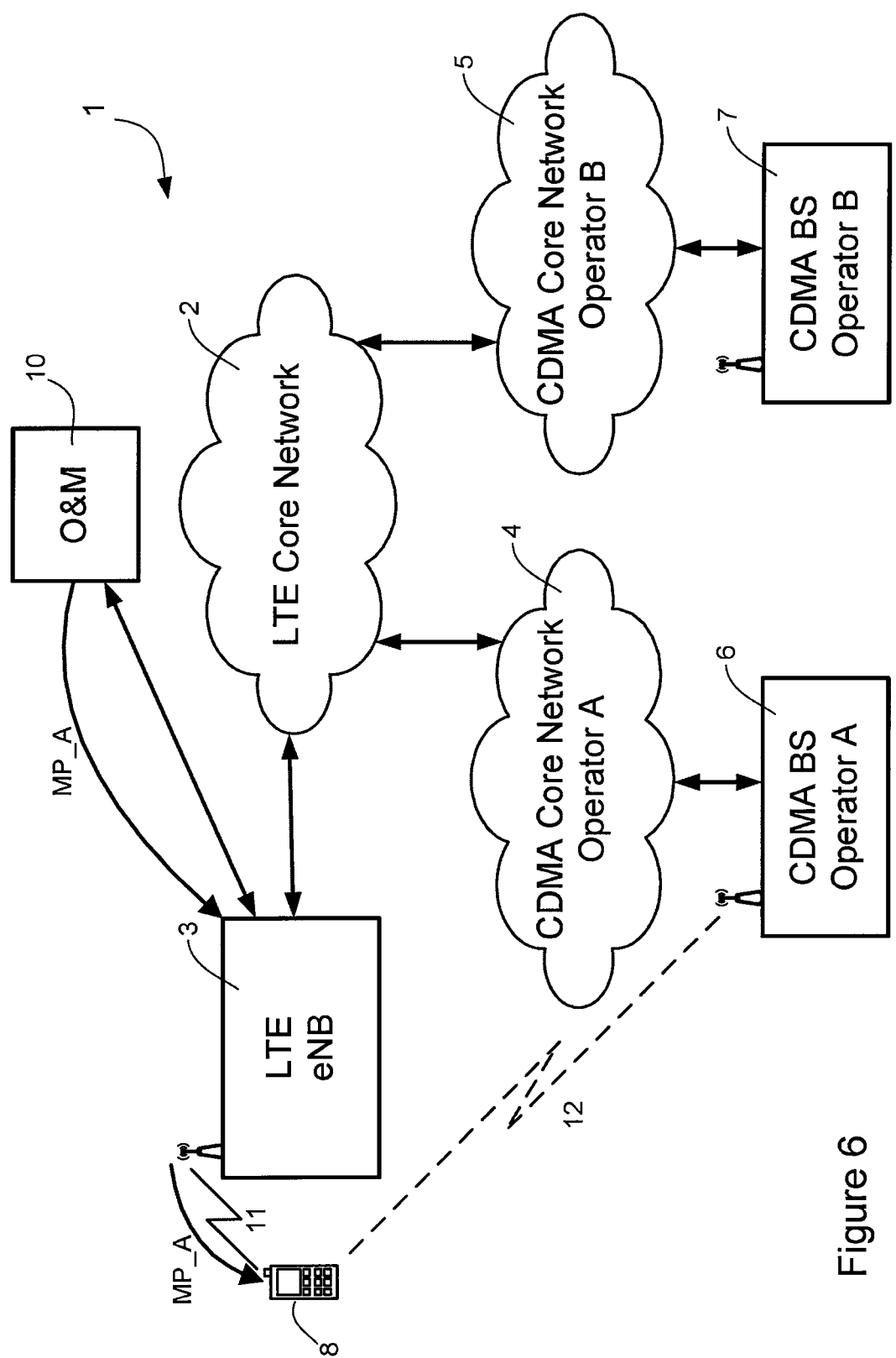
FIG. 6 schematically illustrates a mobile telecommunication system as in FIG. 1, in which the selection of mobility parameters is specified by an Operations and Management (O&M) device.

The embodiments described below provide three broad approaches by which the mobile phone 8 (or other UE) can be provided with the required parameters for mobility purposes, as follows:

(a) the parameters are provided to the LTE eNB 3 by both operator A and operator B, and eNB 3 selects which operator's mobility parameters to send to the mobile phone 8, as illustrated in FIG. 2;

(b) the parameters are provided to the LTE eNB 3 by both operator A and operator B, and eNB 3 sends both operators' mobility parameters to the mobile phone 8, which then selects which to use, as illustrated in FIG. 4; or (c) the parameters are selected by an Operations and Management (O&M) node 10 and are sent to the mobile phone 8 via the LTE core network 2 and the LTE base station 3, as illustrated in FIG. 6.

These three approaches will now be discussed in greater detail.

[Approach (a)—the LTE eNB Selects which Operator's Mobility Parameters to Send to the Mobile Phone]

FIG. 2 illustrates the telecommunication system 1 in which the LTE eNB base station 3 is aware of which CDMA operators (A and B) are available and is aware of the operator to which the mobile telephone 8 is subscribed. In this system, the LTE eNB 3 receives two sets of mobility parameters, MP_A and MP_B, from operators A and B respectively, via the LTE core network 2. As illustrated using the curved arrows, parameters MP_A are provided to the LTE core network 2 from operator A's CDMA base station 6 via operator A's CDMA core network 4. Parameters MP_B are provided to the LTE core network 2 from operator B's CDMA base station 7 via operator B's CDMA core network 5. As those skilled in the art will appreciate, the parameters MP_A and MP_B may also be routed via, or processed by, other intermediary nodes between the CDMA core networks 4 and 5, and the LTE core network 2.

Upon receiving the mobility parameters MP_A and MP_B, the LTE eNB 3 selects one set of parameters to send to the mobile phone 8. When making the selection, the eNB 3 takes into account subscription information for the mobile phone 8, which it obtains, in this embodiment, from the LTE core network 2. In this example, the parameters sent are MP_A, corresponding to the mobile phone's operator, operator A.

On receiving the mobility parameters MP_A from the LTE eNB 3, the mobile phone 8 is then able to establish a connection with operator A's CDMA base station 6, via link 12. In this embodiment, the mobile telephone 8 need not be aware of the C2K operators that are sharing the LTE base station 3.

[Shared Base Station (eNB)]

Figure 3:
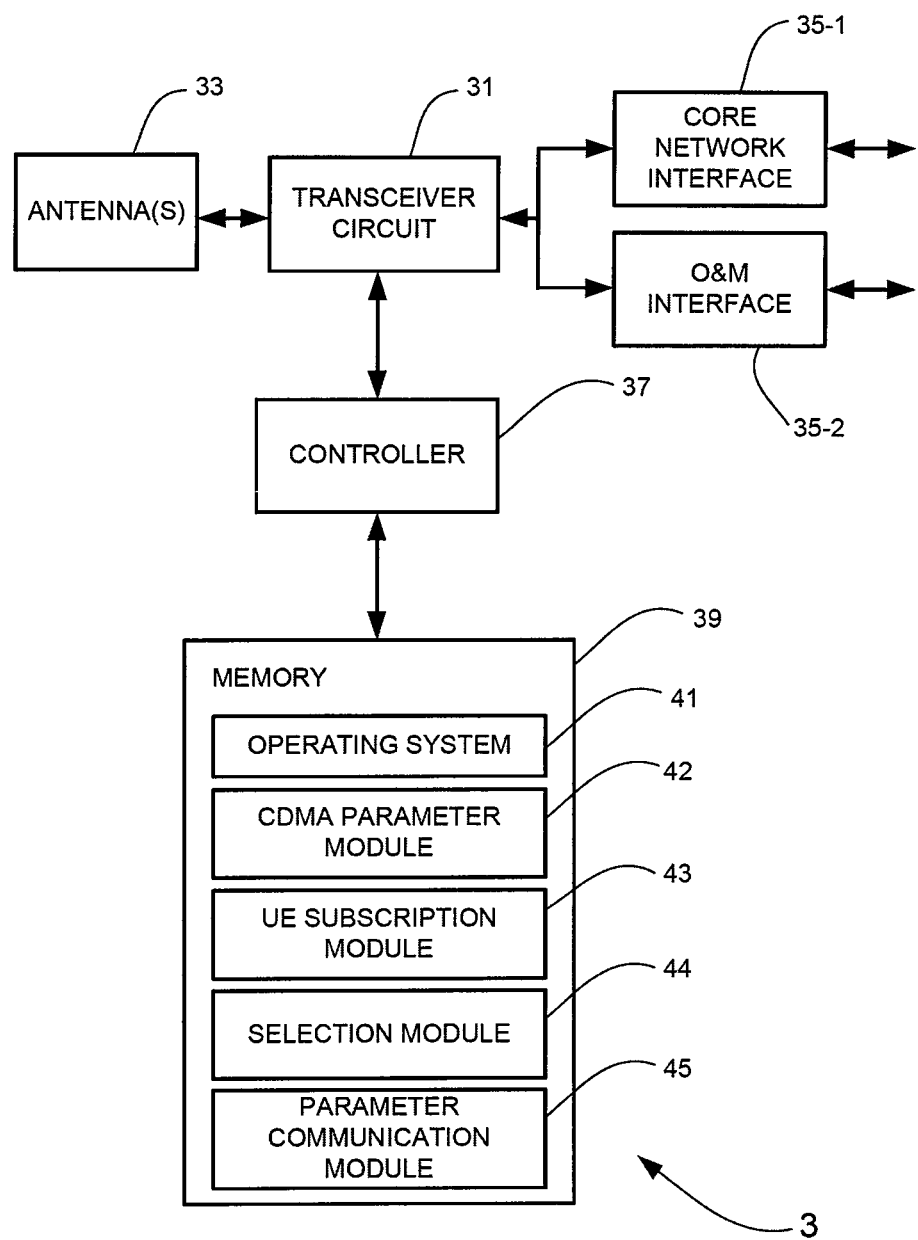
FIG. 3 is a block diagram of an LTE shared base station suitable for use in the telecommunications network of FIGS. 1 and 2.

FIG. 3 is a block diagram illustrating the main components of the shared LTE base station 3 shown in FIG. 2. As shown, the shared base station 3 includes transceiver circuitry 31 which is operable to transmit signals to and to receive signals from mobile telephones 8 via one or more antennae 33 and which is operable to transmit signals to and to receive signals from the LTE core network 2 via a core network interface 35-1 and to transmit signals to and to receive signals from the O&M node 10 via the O&M interface 35-2. A controller 37 controls the operation of the transceiver circuitry 31 in accordance with software stored in memory 39. The software includes, among other things, an operating system 41, a CDMA parameter module 42, a UE subscription module 43, a selection module 44, and a parameter communication module 45.

The CDMA parameter module 42 is operable to receive the above described mobility parameters from the available operators. In the current example, the CDMA parameter module 42 receives parameters MP_A and MP_B from operators A and B respectively. The UE subscription module 43 holds (or retrieves) the subscription details of the mobile phone 8. In the present example, the subscription module 43 holds data specifying that the phone 8 is associated with operator A. The selection module 44 is operable to select which mobility parameters are to be sent to the mobile phone 8 based on the subscription data. In the present example, the selection module 44 selects mobility parameters MP_A, since the data held by the subscription module 43 specifies that the mobile phone 8 is associated with operator A.

Finally, the parameter communication module 45 is operable to transmit the selected mobility parameters to the mobile phone 8, via the controller 37, transceiver circuit 31 and antenna(s) 37. In the present example, the parameter communication module 45 transmits mobility parameters MP_A, which the mobile phone 8 then uses in order to establish the link 12 with operator A's CDMA base station 6.

[Approach (b)—the LTE eNB Sends Both Operators' Mobility Parameters to the Mobile Phone, which then Selects which to Use]

FIG. 4 illustrates a telecommunication system 1 in which the LTE eNB base station 3 does not know with which operator the mobile phone 8 is associated. In this example, the LTE base station 3 is aware of the C2K operators that share the base station 3 and it sends the parameters for both operators to the telephone 8 for selection. As with the previous approach, in this system the LTE eNB 3 receives two sets of mobility parameters, MP_A and MP_B, from operators A and B respectively, via the LTE core network 2. As illustrated using the curved arrows, parameters MP_A are provided to the LTE core network 2 from operator A's CDMA base station 6 via operator A's CDMA core network 4. Parameters MP_B are provided to the LTE core network 2 from operator B's CDMA base station 7 via operator B's CDMA core network 5. As those skilled in the art will appreciate, the parameters MP_A and MP_B may also be routed via, or processed by, other intermediary nodes between the CDMA core networks 4 and 5, and the LTE core network 2.

Upon receiving the mobility parameters MP_A and MP_B, the LTE eNB 3 sends both sets of parameters to the mobile phone 8. The parameters may be sent together or separately.

For example, the LTE base station 3 may send the parameters in a modified RRC (Radio Resource Control) message that includes both sets of mobility parameters. This is illustrated below for the CSFB mobility parameters:

```
CSFBParametersResponseCDMA2000-r8-IEs ::= SEQUENCE {
    rand
        RAND-CDMA2000,
    mobilityParameters          MobilityParametersCDMA2000,
    nonCriticalExtension    CSFBParametersResponseCDMA2000-v8a0-IEs
                                OPTIONAL
}
CSFBParametersResponseCDMA2000-v8a0-IEs ::= SEQUENCE {
    lateNonCriticalExtension            OCTET STRING
        OPTIONAL, -- Need OP
    nonCriticalExtension CSFBParametersResponseCDMA2000-vXYZ-IEs
        OPTIONAL  -- Need OP
}
CSFBParametersResponseCDMA2000-vXYZ-IEs ::= SEQUENCE {
    mobilityParameters              MobilityParametersCDMA2000,
    nonCriticalExtension        SEQUENCE { }
                OPTIONAL   -- Need OP
}
```

Instead of modifying the RRC message, the LTE base station 3 may send both sets of parameters using the procedures described in C.S0097. In particular, C.S0097 describes, in Chapter 3, the parameters that the LTE base station 3 sends the mobile telephone 8. Currently, this 3GPP standards document only defines one set of mobility parameters that should be sent from the LTE base station 3 to the mobile telephone 8. These parameters may be sent, for example, in an A21 1xparameters message; and therefore, as an alternative to changing the RRC message, the A21 1xparameters message may be adapted to carry both sets of mobility parameters for the shared operators.

Instead of the LTE base station 3 being aware of the sharing C2K operators, in a further alternative, the LTE base station 3 may not be aware of the existence of the sharing C2K operators. In this case, the CDMA base stations 6, 7 could send their mobility parameters in a transparent container to the telephone 8. This means that the LTE base station 3 simply forwards the received information to the telephone 8 without knowing its contents. This could be achieved by extending an existing message that is transmitted from the CDMA base stations 6,7 via the CDMA network 4,5, the LTE network 2 and the LTE base station 3 to the mobile telephone 8. One example of a message that can be extended is the A21 1×parameters message (details of which can be found in A.S0009-C v4.0 Chapter 5.1.8.3, the content of which is hereby incorporated by reference) that is generated by the CDMA base station and transmitted towards the mobile telephone 8 via the core networks.

On receiving both sets of mobility parameters MP_A and MP_B, the mobile phone 8 selects which set of parameters is appropriate for its operator. When making the selection, the phone 8 takes into account subscription data held in the mobile phone 8. In the present example, parameters MP_A are selected, as the phone 8 is associated with operator A. Using these parameters (MP_A), the mobile phone 8 is then able to establish a connection with operator A's CDMA base station 6, via link 12.

[Mobile Phone]

Figure 5:
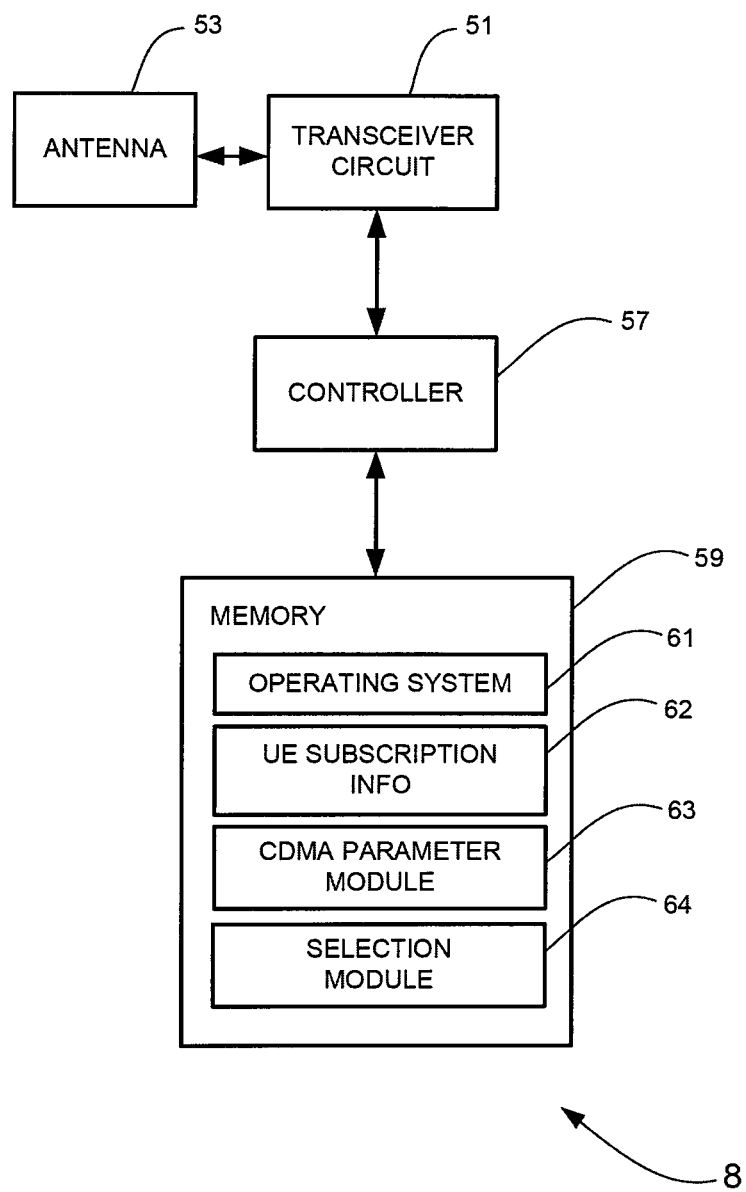
FIG. 5 is a block diagram of user equipment suitable for use in the telecommunications network of the preceding figures, in particular FIG. 4.

FIG. 5 is a block diagram illustrating the main components of the mobile phone 8 as shown in FIG. 4. The mobile phone 8 has a transceiver circuit 51 which is operable to transmit signals to, and to receive signals from, base stations (e.g. 3 and 6) via at least one antenna 53. The operation of the transceiver circuit 51 is controlled by a controller 57 in accordance with software stored in memory 59. The phone 8 will also have a user interface to allow a user to interact with the phone 8, although this is not shown for clarity.

The software includes, among other things, an operating system 61, UE subscription information 62, a CDMA parameter module 63, and a selection module 64. The UE subscription information 62 comprises data specifying the operator to which the mobile phone 8 is associated. In the current example, this is operator A. The CDMA parameter module 63 is operable to receive the mobility parameters transmitted from the eNB base station 3. In the present example, these parameters are MP_A and MP_B, sent by operators A and B respectively. The selection module 64 is operable to select the appropriate mobility parameters depending on the subscription information 62. In present example, the subscription information 62 specifies operator A, and consequently the selection module selects mobility parameters MP_A from the parameter module 63 in order to establish the link 12 with operator A's CDMA base station 6.

[Approach (c)—Operations and Management (O&M) Selection]

In this approach, the appropriate mobility parameters are selected by operations and management (O&M) node 10. In this example, O&M node 10 is informed about which LTE operator PLMN the mobile telephone 8 selects when it sends the RRC Connection Setup Complete Message. The O&M node 10 uses that LTE PLMN information to identify the corresponding C2K network to which the telephone 8 is subscribed and sends the appropriate mobility parameters MP_A back to the LTE base station 3 for transmission to the phone 8. The O&M node 10 identifies the corresponding C2K network from a table that it maintains that maps the C2K operator PLMN IDs with the LTE PLMN IDs and the C2K cell/base station IDs. This table may be set up manually initially and then maintained autonomously using, for example, SON-ANR (Self Organising Networks-Automatic Neighbour Relations) techniques or information received from the C2K base stations over the S1-tunnel interface.

An example of the mapping table which may be stored in the O&M node 10 is given in Table 1 below. This table considers the above scenario where C2K operators A and B share the LTE core network 2 and the LTE base station 3.

TABLE 1 example O&M mapping table

| C2K Cell ID/<br>Base ID | C2K PLMN ID | LTE PLMN ID |
|---|---|---|
| 11 | A | K |
| 12 | C | L |
| 13 | B | K |

In this table, the LTE PLMN ID is the identity for the shared LTE core network 2; the C2K PLMN ID is the identity of the C2K PLMN and C2K Cell ID/Base ID is the identity of the corresponding C2K cell or base station operated by the corresponding C2K PLMN. Thus, in the table, LTE core network 2 has an LTE PLMN ID of "K". As it is shared by two C2K operators, it has two entries in the table—one for each of the two operators. In this example, the cell/base station ID for operator A is "11" and for operator B it is "13". Other entries are provided in the table for other LTE PLMNs. This is illustrated by the entry shown for the LTE PLMN having ID "L".

The shared LTE base station 3 broadcasts the LTE PLMN IDs of all the operators that share the LTE base station 3. If the operators do not share the core network 2 and just share the base station 3, then the LTE base station 3 will broadcast different LTE PLMN IDs. The mobile telephone 8 will select a broadcast LTE PLMN ID based on its stored subscription information, and include it within the RRC Connection Setup Complete Message that it sends to the LTE base station 3. In this case, as the LTE PLMN IDs for the sharing operators are different, the O&M node 10 can determine the corresponding C2K PLMN ID just using the LTE PLMN ID selected by the mobile telephone 3 (that is included in the RRC complete message).

However, in embodiments where the operators share the LTE core network 2, the mobile telephone selected LTE PLMN will not be enough to identify the desired C2K PLMN ID. For example, as can be seen from Table 1, if the mobile telephone selected LTE PLMN ID (as contained in the RRC Connection Setup Complete Message) identifies the LTE PLMN as "K", then it is ambiguous as this could correspond to C2K PLMN ID "A" or C2K PLMN ID "B". In order to differentiate between the two, the mobile telephone 8 should also report the C2K cell or base station ID. The mobile telephone 8 already reports this information to the LTE base station 3 in the RRC measurement report that sends. For the above example, the mobile telephone 8 is subscribed to operator A. Therefore, in the RRC measurement report that the mobile telephone 8 sends, it will include the C2K cell or base station ID "11" and it will not include the C2K cell or base station ID "13"—as it is not a subscriber of that operator. The LTE base station 3 provides the mobile telephone 8 with a list of neighbour C2K cells about which the mobile telephone 8 is to report (in the Neighbour Cell List, NCL). This list may have been filtered by the LTE base station 3 to exclude cells to which the mobile telephone 8 is not allowed access. However, if this is an unfiltered list, then the mobile telephone 8 will filter the list using its stored subscription information so that it only reports on the cells where it is allowed access. The O&M node 10 can then use the reported C2K cell ID information and the selected LTE PLMN ID to determine from Table 1, that the corresponding C2K operator is "A" and select the mobility parameters (MP_A) accordingly.

Typically, the O&M node 11 will store in advance the mobility parameters for the different C2K operator cells/base stations (e.g. MP_A and MP_B). Alternatively, the O&M node 10 may request the mobility parameters from the identified C2K cell or base station before forwarding them to the mobile telephone 8 via the shared LTE base station 3.

The O&M node 10 may be initially created by manual operator configuration and then may be autonomously updating using, for example, SON-ANR enhancements or S1 signalling enhancements (although SON-ANR can also be used for initial configuration i.e. there is no need for any manual configuration), as follows:

[SON-ANR Enhancements]

The mapping table update can be done via SON-ANR, for example once a month. This involves each mobile telephone 8 connected to an LTE base station 3, detecting any cells/base stations that are broadcasting within its range. The mobile telephone then reports information for any cell/base station that it has found to the LTE base station 3. Currently, the information that is reported includes a BASEID, sid and nid for each detected cell/base station. This may not be sufficient for the present proposal. In particular, whilst it may be possible to uniquely identify the C2K cell or base station from these reported values, it is complex to do so and would require the LTE base station 3 (or the O&M node 10) to maintain a mapping for every possible combination of sid/nid values to the corresponding C2K PLMN ID. Therefore, in addition to reporting these values, it is proposed that the mobile telephone 8 also reports, in addition to the existing parameters, a new parameter to identify the C2K PLMN, e.g. the C2K PLMN ID. Currently, C2K base stations 6,7 do not broadcast this id information and it is proposed that they be adapted to do so. They may broadcast this information, for example, using any existing IEs e.g. the MNC (mobile network code).

[S1-Tunnel]

Instead of using SON-ANR techniques to build or update the mapping table, new techniques may be established when the LTE base station 3 is initially installed to allow it to exchange PLMN cell IDs with neighbouring C2K base stations 6,7 using a tunnel over the S1 interface (between it and the LTE core network 2), through the LTE network 2, the C2K networks 4,5 and to the C2K base stations 6,7. In this case, the LTE base station 3 will be aware of the sharing C2K operators.

[O&M Node]

Figure 7:
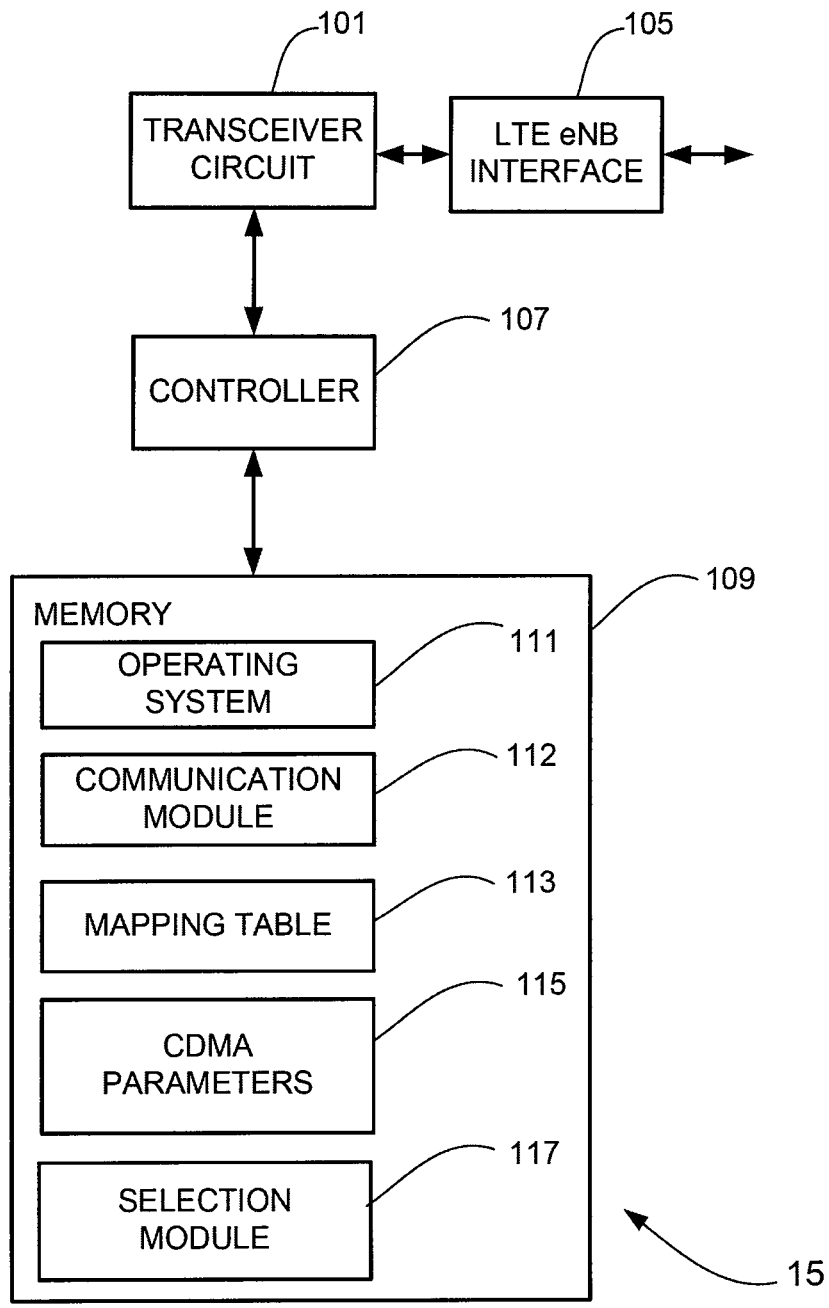
FIG. 7 is a block diagram of an O&M device suitable for use in the telecommunications network of the preceding figures, in particular FIG. 6.

FIG. 7 illustrates a block diagram of the O&M node 10 used in this embodiment. As shown, the O&M node 10 includes a transceiver circuit 101 which is operable to transmit signals to and to receive signals from the LTE base station 3 via an LTE eNB interface 105. The operation of the transceiver circuit 101 is controlled by a controller 107 in accordance with software stored in memory 109. The software and data stored in the memory include, among other things, an operating system 111, a communication module 112, the above described mapping table 113, CDMA mobility parameters 115 (supplied by the CDMA network operators), and a selection module 117.

In operation, the communication module 112 receives the RRC Connection Setup Complete Message and the RRC measurement report from the telephone 8 via the LTE base station 3. The communication module 112 extracts the C2K operator PLMN ID and the C2K cell/base station ID from the received RRC messages and use it to look up the mapping table 113. The selection module 117 then selects the corresponding mobility parameters MP_A or MP_B from the stored CDMA parameters 115 based on the C2K PLMN ID obtained from the mapping table. The communication module 112 then sends the mobile telephone 8 the selected mobility parameters (in this example MP_A) via the LTE base station 3.

Modifications and Alternatives

A number of detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

While the above described embodiments have been limited to two network operators sharing an LTE base station and core network, it will be appreciated that three, four, or more network operators may share parts of the network, and that the described embodiments are equally applicable to networks shared by more than two operators.

In the first approach outlined above, the LTE base station selected the mobility parameters based on user subscription information. In an alternative embodiment, the LTE base station may hold the mapping table discussed above that was used by the O&M node. In this case, the base station would extract the information from the received RRC Connection Setup Complete message and from the RRC measurement report and use the information to look up the corresponding C2K PLMN ID from the table. In a further embodiment, the mapping table may be stored in the O&M node and queried by the LTE base station to retrieve the desired C2K PLMN ID. This would be similar to the third approach outlined above, except that the final selection of the mobility parameters to be sent to the mobile telephone would be performed by the LTE base station rather than by the O&M node.

In one of the above embodiments, an O&M node performed the selection of the mobility parameters for the mobile telephone. Other devices in the LTE core network 2 may perform the selection, based on user subscription information for the relevant mobile telephone 8. For example, a Mobility Management Entity (MME) node may perform the selection instead.

In the above embodiment, a mobile telephone based telecommunications system was described. As those skilled in the art will appreciate, the techniques described in the present application can be employed in any communications system. In the general case, the base stations and the mobile telephones can be considered as communications nodes or devices which communicate with each other. Other communications nodes or devices may include access points and user devices such as, for example, personal digital assistants, laptop computers, web browsers, etc.

In the above embodiments, a number of software modules were described. As those skilled in the art will appreciate, the software modules may be provided in compiled or un-compiled form and may be supplied to the base station or the MME as a signal over a computer network, or on a recording medium. Further, the functionality performed by part or all of this software may be performed using one or more dedicated hardware circuits. However, the use of software modules is preferred as it facilitates the updating of the base station and the MME in order to update their functionality. Similarly, although the above embodiments employed transceiver circuitry, at least some of the functionality of the transceiver circuitry can be performed by software.

Various other modifications will be apparent to those skilled in the art and will not be described in further detail here.

The present application claims the benefit of priority from United Kingdom patent application No. 1204700.7, filed on Mar. 16, 2012, the disclosure of which is incorporated herein in its entirety by reference.

The invention claimed is:

1. A User Equipment (UE) for communicating with an LTE shared network and a CDMA2000 network, the UE comprising:
 a memory for storing instructions; and
 one or more processors configured to execute the instructions to:
  control a transceiver to communicate with an LTE network communications apparatus of the LTE shared network serving a plurality of LTE Public Land Mobile Networks (PLMNs);
  based on a one-to-one mapping between a PLMN of the UE and a given CDMA2000 network, apply a set of CDMA2000 parameters corresponding to the PLMN; and
  control the transceiver to receive a message from the LTE network communications apparatus of the LTE shared network serving the plurality of LTE PLMNs, the received message comprising:
   respective sets of parameters for each of a plurality of different CDMA2000 networks; and
   a list of CDMA2000 neighboring cells;
    wherein the one or more processors are configured to apply the set of CDMA2000 parameters corresponding to the PLMN based on information specifying:
    (i) at least one of a CDMA2000 cell or a base station identity;
    (ii) a CDMA2000 network identity; and
    (iii) an LTE network identity.

2. An LTE network communications apparatus of an LTE shared network serving a plurality of LTE Public Land Mobile Networks (PLMNs) for communicating with a user equipment (UE), the network communications apparatus comprising:
 a memory for storing instructions; and
 one or more processors configured to execute the instructions to:
  control a transceiver to communicate with the UE, wherein, based on a one-to-one mapping between a PLMN of the UE and a given CDMA2000 network, a set of CDMA2000 parameters corresponding to the PLMN can be applied by the UE; and
  control the transceiver to transmit a message to the UE, the message comprising:
   respective sets of parameters for each of a plurality of different CDMA2000 networks; and
   a list of CDMA2000 neighboring cells;
    wherein the set of CDMA2000 parameters corresponding to the PLMN are applied based on information specifying:
    (i) at least one of a CDMA2000 cell identity or a base station identity;
    (ii) a CDMA2000 network identity; and
    (iii) an LTE network identity.

3. The LTE network communications apparatus as claimed in claim 2, further comprising a shared LTE base station configured to serve a plurality of network operators.

4. The LTE network communications apparatus as claimed in claim 3, wherein the one or more processors is further configured to execute the instructions to: broadcast a plurality of LTE network identities, wherein at least one of the one or more processors is configured to determine an LTE network identity selected by the UE, and to map the selected LTE network identity to a corresponding CDMA2000 network identity, wherein the selected LTE network identity is an identity of the PLMN.

5. A method performed by an LTE network communications apparatus serving a plurality of LTE Public Land Mobile Networks (PLMNs) for communicating with a user equipment (UE), the method comprising:
 communicating with the UE, wherein, based on a one-to-one mapping between a PLMN of the UE and a given CDMA2000 network, a set of CDMA2000 parameters corresponding to the PLMN can be applied by the UE; and
 transmitting a message to the UE, the message comprising:
  respective sets of parameters for each of a plurality of different CDMA2000 networks; and
  a list of CDMA2000 neighboring cells;
   wherein the set of CDMA2000 parameters corresponding to the PLMN are applied based on information specifying:
   (i) at least one of a CDMA2000 cell identity or a base station identity;
   (ii) a CDMA2000 network identity; and
   (iii) an LTE network identity.

6. The method as claimed in claim 5, being performed by a shared LTE base station serving a plurality of network operators.

7. The method as claimed in claim 5, further comprising broadcasting a plurality of LTE network identities, determining a LTE network identity selected by the UE, and mapping the selected LTE network identity to a corresponding CDMA2000 network identity, wherein the selected LTE network identity is an identity of the PLMN.

8. A method performed by a user equipment (UE) for communicating with an LTE shared network and a CDMA2000 network, the method comprising:
 communicating with an LTE network communications apparatus of the LTE shared network serving a plurality of LTE Public Land Mobile Networks (PLMNs);
 based on a one-to-one mapping between a PLMN of the UE and a given CDMA2000 network, applying a set of CDMA2000 parameters corresponding to the PLMN; and
 receiving a message from the LTE network communications apparatus of the LTE shared network serving the plurality of LTE PLMNs, the received message comprising:
  respective sets of parameters for each of a plurality of different CDMA2000 networks; and
  a list of CDMA2000 neighboring cells;
   wherein said applying the set of CDMA2000 parameters corresponding to the PLMN is based on information specifying:
   (i) at least one of a CDMA2000 cell identity or a base station identity;
   (ii) a CDMA2000 network identity; and
   (iii) an LTE network identity.

9. A non-transitory computer readable medium storing computer implementable instructions comprising computer implementable instructions for causing a programmable computer device to become configured as the LTE network communications apparatus of claim 2.

10. A non-transitory computer readable medium storing computer implementable instructions comprising computer implementable instructions for causing a programmable computer device to become configured as the mobile communications device of claim 1.

11. A non-transitory computer readable medium storing computer implementable instructions comprising computer implementable instructions for causing a programmable computer device to become configured to implement the method of claim 5.

* * * * *